United States Patent [19]

Dismukes et al.

[11] Patent Number: 5,696,217

[45] Date of Patent: Dec. 9, 1997

[54] SYNTHESIS OF MICROPOROUS CERAMICS BY AMMONIA PYROLYSIS OF CERAMIC PRECURSORS

[75] Inventors: John Pickett Dismukes, Annadale; John Stewart Bradley, Gladstone; Jack Wayne Johnson, Clinton, all of N.J.; Edward William Corcoran, Jr., Easton, Pa.

[73] Assignee: Exxon Research & Engineering Company, Florham Park, N.J.

[21] Appl. No.: 385,299

[22] Filed: Feb. 10, 1995

Related U.S. Application Data

[63] Continuation-in-part of Ser. No. 248,289, May 24, 1994, abandoned.

[51] Int. Cl.$^6$ .............................. C08G 77/00; C04B 35/52
[52] U.S. Cl. .......................... 528/10; 501/88; 501/80; 501/92; 106/287.11; 106/287.12
[58] Field of Search .................... 501/88, 92, 80; 528/10; 106/287.11, 287.12

[56] References Cited

U.S. PATENT DOCUMENTS

| | | | |
|---|---|---|---|
| 4,833,107 | 5/1989 | Kaya et al. | 501/97 |
| 4,835,207 | 5/1989 | Semen et al. | 524/443 |
| 4,891,340 | 1/1990 | Semen et al. | 501/88 |
| 4,937,304 | 6/1990 | Ayama et al. | 528/34 |
| 4,942,145 | 7/1990 | Moehle et al. | 501/90 |
| 4,950,381 | 8/1990 | Takeuchi et al. | 528/10 |
| 5,006,492 | 4/1991 | Semen et al. | 501/97 |

FOREIGN PATENT DOCUMENTS

| | | | |
|---|---|---|---|
| 0200326A1 | 12/1986 | European Pat. Off. | C04B 35/56 |
| 0331424A1 | 9/1989 | European Pat. Off. | C04B 35/58 |
| 0376183A1 | 7/1990 | European Pat. Off. | C04B 35/58 |
| 0389084A2 | 9/1990 | European Pat. Off. | C08G 77/56 |

OTHER PUBLICATIONS

J. F. Janik et al, "Boron Nitride as a Selective Gas Adsorbent", Langmuir 1994, vol. 10, pp. 514–518.

T. T. Borek et al, "Highly Microporous Boron Nitride For Gas Adsorpition", Langmuir 1991, vol. 7, pp. 2844–2846.

M. Peuckert et al, "Ceramics from Organometallic Polymers", Adv. Mater. 2 (1990), No. 9, pp. 398–404.

H. N. Han et al, "Pyrolysis Chemistry of Poly(organosilazanes) to Silicon Ceramics", Feb. 24, 1992, pp. 705–711.

E. J. Grosgogeat et al, "A method for the determination of the pore size distribution of molecular sieve materials and its application to the characterization of partially pyrolyzed polysilastyrene/porous glass composite membranes", J. of Membrane Science, 57 (1991) 237–255.

A. W. Reid et al, "Nanoporosity in Ceramics from Polymeric Precursors", Mat. Res. Soc. Symp. Proc., vol. 346, '94 Materials Research Society, pp. 843–848.

*Primary Examiner*—Karen A. Dean
*Attorney, Agent, or Firm*—Jay Simon

[57] ABSTRACT

The present invention provides for microporous ceramic materials having a surface area in excess of 100 m$^2$/gm and an open microporous cell structure wherein the micropores have a mean width of less than 20 Angstroms and wherein said microporous structure comprises a volume of greater than about 0.05 cm$^3$/gm of the ceramic. The pyrolysis product of ceramic precursor oligomers or polymers having a number average molecular weight in the range of from about 200 to about 100,000 g/mole in an ammonia atmosphere at temperatures of up to less than about 1200° C. gives rise to the microporous ceramics of the invention. Also provided is a process for the preparation of the microporous ceramics of the invention involving pyrolysis of the ceramic precursor under controlled conditions of heating and with intermediate hold times, up to temperatures of less than 1200° C., preferably less than 1000° C., to form a microporous ceramic product.

24 Claims, No Drawings

SYNTHESIS OF MICROPOROUS CERAMICS BY AMMONIA PYROLYSIS OF CERAMIC PRECURSORS

This application is a continuation-in-part of U.S. Ser. No. 248,289 filed May 24, 1994, now abandoned.

BACKGROUND OF THE INVENTION

1. Field of the Invention

The present invention relates to open pore, microporous ceramic materials and their method of manufacture.

2. Description of Related Art

Porous materials play a particularly important role in a number of chemical processing industries and applications. Separations based on membranes are critical in such fields as chemical recovery, purification and dehumidification. Porous oxides (e.g., clays, silica, alumina and zeolite) are the materials of choice as catalysts or catalyst supports in chemical and petroleum processing reactions such as hydrocracking, hydrodesulfurization, reforming, and polymerization.

With respect to membrane technology, inorganic membranes offer a number of advantages over polymeric membranes which are typically limited to uses at temperatures below about 250° C. These include: i) higher operating temperatures, ii) greater structural integrity and hence the ability to withstand higher pressure differentials and backflushing and iii) improved resistance to corrosion. Porous oxide (e.g., aluminum oxide) and carbon membranes offer some of these characteristics, but advanced materials are still required for improved strength, toughness, structural integrity, temperature stability, water and oxygen resistance, thermal shock resistance, molecular selectivity to small molecules and gases, and high flux.

Similar considerations apply to clay and metal oxide type catalysts or catalyst supports, particularly as relates to stability and thermal shock resistance at temperatures above about 500° C.

Ceramic materials of the Si—C, Si—N, Si—C—N, Si—B—C, Si—BN, Al—N, Si—Al—N, B—Al—N and related types appear to offer many of the properties set forth above. However, the solgel synthesis methods typically used to prepare porous oxide membranes or catalyst supports are incompatible with the preparation of ceramics of the type described above because of the need to use water in their preparation. Sintering or reactive sintering of these ceramics likewise produces materials with pore sizes of from about 0.1 to about 1000 microns which are non-uniform and generally too large for effective molecular separation and other uses described above. Chemical vapor deposition can produce microporous ceramic layers, but this tends to be an expensive, high temperature process with limited ability to tailor complex ceramic compositions.

Recently, researchers have discovered improved methods for preparing ceramics using ceramic precursors as starting materials. A ceramic precursor is a material, a chemical compound, oligomer or polymer, which upon pyrolysis in an inert atmosphere and at high temperatures, e.g., above about 700°–1000° C., preferably above 1000° C., will undergo cleavage of chemical bonds liberating such species as hydrogen, organic compounds, and the like, depending upon the maximum pyrolysis temperature. The resulting decomposition product is typically an amorphous ceramic containing Si—C bonds (silicon carbide), Si—N bonds (silicon nitride) or other bond structures which will vary as a function of the identity of the ceramic precursor, e.g., Si—C—N, Si—N—B, B—N, Al—N and other bond structures, as well as combinations of these structures. Crystallization of these amorphous ceramic products usually requires even higher temperatures in the range of 1200°–1600° C.

The pyrolysis of various ceramic precursors, e.g., polycarbosilanes, polysilanes, polycarbosiloxanes, polysilazanes, and like materials at temperatures of 1300° C. and higher to produce ceramic products, e.g., silicon carbide and/or silicon nitride, is disclosed, for example, in M. Peuckert et al., "Ceramics from Organometallic Polymers", Adv. Mater. 2, 398–404 (1990). The pyrolysis of polyorganosilazanes under ammonia atmosphere at pyrolysis temperatures up to 1400° C. is also disclosed in Han et al., "Pyrolysis Chemistry of Poly(organosilazanes) to Silicon Ceramics", Chem. Mater., Vol. 4, No. 3, pp. 705–711 (1992).

During pyrolysis, preceramic precursors such as described above liberate various gaseous decomposition species such as hydrogen and organic compounds, including methane, higher molecular weight hydrocarbon molecules, lower molecular weight precursor fragments and H—C—N species. These gases tend to coalesce within the preceramic matrix as they form, resulting in a bulking or swelling of the mass. These entrained gases can lead to the formation of gas bubbles within the developing ceramic mass as the preceramic precursor crosslinks and hardens, resulting in a lower density ceramic having a voluminous, macroporous or mesoporous closed-cell structure, without development of a significant amount of open celled micropores.

Where dense, non-porous ceramic materials are sought using ceramic precursors yielding high gas volumes, it is often necessary to conduct the pyrolysis over a very long period of time with very gradual incremental temperature increases and/or under vacuum to assist in removal of these gaseous species at temperatures where they are formed.

SUMMARY OF THE INVENTION

The present invention provides for amorphous, microporous, ceramic materials having a surface area in excess of 100 m$^2$/gm, more preferably in excess of 150 m$^2$/gm, still preferably in excess of 200 m$^2$/gm, e.g., in excess of 250 m$^2$/gm or in excess of 300 m$^2$/gm and an open pore microporous cell structure wherein the micropores have a mean width (diameter) of less than 20 Angstroms and wherein said microporous structure comprises a volume of greater than about 0.05 cm$^3$/gm, preferably greater than 0.09 cm$^3$/gm, still more preferably in excess of 0.13 cm$^3$/gm, of the ceramic. Also provided is a process for the preparation of the microporous ceramics of the invention comprising: a) providing a ceramic precursor oligomer or polymer having a number average molecular weight in the range of from about 200 to about 100,000 g/mole, b) gradually heating said precursor in the presence of ammonia gas to a maximum temperature in the range of from about 400° C. up to less than about 1200° C. preferably about 500° C. to less than about 1000° C., to form a microporous ceramic product, and c) cooling said microporous ceramic product, said heating characterized by a rate of temperature increase between about 300° C. to 600° C., or between about 300° C. to T$_{max}$ if T$_{max}$ is less than 600° C., of less than about 5° C. per minute.

The microporous ceramics prepared in accordance with this invention generally exhibit a surface area within the range of from about 100 to about 500 m$^2$/gm based on the weight of the product phase, and amorphous phase micropore volumes of greater than 0.05 up to about 0.20 cm³/g, wherein the volume fraction of micropores in the ceramic product ranges from about 12% to about 36%.

Ceramics produced in accordance with this invention are particularly useful in bulk sorbent applications, as active layers in membrane separation structures, and as catalyst supports.

DETAILED DESCRIPTION OF THE INVENTION

As used herein, the term microporous ceramic refers to a ceramic having a porous structure wherein the pores have a mean width (diameter) of less than 20 Angstroms. This definition and the physical and chemical adsorption behavior of microporous materials are disclosed in S. J. Gregg and K. S. W. Sing, "Adsorption, Surface Area and Porosity", Academic Press, New York, 1982; and S. Lowell and J. F. Shields, "Powder Surface Area and Porosity", Chapman and Hall, New York, 3rd Edition, 1984. This term is to be contrasted with the term "mesoporous" which refers to pores having a mean width of greater than 20 Angstroms up to about 500 Angstroms, and with the term "macroporous", which refers to pores having a mean width of 500 Angstroms or greater. More specifically, the term microporous refers to such structures wherein essentially all of the pores have a width of from about 2 to about 20 Angstroms. The surface area and micropore volume are calculated from the nitrogen adsorption isotherm, which is measured at 77° K. using an automated continuous flow apparatus. The total surface area is calculated using the BET method, and the micropore volume and mesopore/macropore surface area are calculated using the T-plot method, as described in the Gregg reference above. Subtraction of the mesopore/macropore surface area from the total surface area gives an estimate of the micropore surface area.

In copending patent applications Ser. No. 248,290 filed May 24, 1994 and Ser. No. 248,291 filed May 24, 1994 in the United States, it is disclosed that microporous ceramics can be achieved by the pyrolysis of a preceramic intermediate composition based on an intimate mixture of from about 30 to 99 parts by weight of a pre-ceramic precursor polymer or oligomer and correspondingly from about 1 to 70 parts by weight of a particulate material having a particle size of less than 10 microns. In this process, pyrolysis is conducted at temperatures of up to less than about 1100° C. under flowing inert gas such as helium or nitrogen, or under ammonia gas. Those inventions were based on the discovery that the presence of a particulate filler in the preceramic matrix served to prevent nucleation of large bubbles of decomposition gases as they were generated during decomposition under inert or ammonia gas, thereby yielding a microporous structure in the pyrolyzed product rather than a voluminous, macroporous mass of low bulk density which was achieved where pyrolysis was conducted under inert gas and the particulate material was not present in the precursor.

It has now further been discovered that microporous ceramics can be achieved without the need to include particulate material in the pre-ceramic composition by conducting the pyrolysis at a controlled rate of heating and under flowing ammonia gas and at maximum heating temperatures of less than 1200° C., preferably less than 1000° C.

Ceramic precursor materials which are preferred for the purposes of this invention include oligomers and polymers such as polysilazanes, polycarbosilazanes, polycarbosilanes, vinylic polysilanes, amine boranes, polyphenylborazanes, carboranesiloxanes, polysilastyrene, polytitanocarbosilanes, alumanes, polyalazanes and like materials, as well as mixtures thereof, whose pyrolysis products yield ceramic compositions containing structural units having bond linkages selected from Si—C, Si—N, Si—CN, Si—B, Si—B—N, Si—B—C, Si—C—N—B, Si—Al—N—C, Si—Al—N, AlN, B—N, Al—N—B and B—N—C, as well as oxycarbide and oxynitride bond linkages such as Si—O—N, Si—Al—O—N and TiO—C. The preferred precursors are those oligomers and polymers having a number average molecular weight in the range of from about 200 to about 100,000 g/mole, more preferably from about 400 to about 20,000 g/mole. The chemistry of these oligomeric and polymeric precursors are further disclosed in the monograph "Inorganic Polymers", J. E. Mark, H. R. Allcock, and R. West, Prentice Hall, 1992.

Particularly preferred polysilazanes are those materials disclosed in U.S. Pat. Nos. 4,937,304 and 4,950,381, the complete disclosures of which are incorporated herein by reference. These materials contain, for example, recurring [—Si(H)(CH₃)—NH—] and [—Si(CH₃)₂—NH—] units and are prepared by reacting one or a mixture of monomers having the formula R₁SiHX₂ and R₂R₃SiX₂ in anhydrous solvent with ammonia. In the above formulas, R₁, R₂ and R₃ may be the same or different groups selected from hydrocarbyl, alkyl silyl or alkylamino and X₂ is halogen. The preferred polysilazanes are prepared using methyldichlorosilane or a mixture of methyldichorosilane and dimethyldichlorosilane as monomer reactants with ammonia. The primary high temperature pyrolysis products (>1300° C.) of this precursor in an inert atmosphere are silicon nitride (Si₃N₄) and silicon carbide (SiC). These precursors are commercially available from Chisso Corporation, Japan under the trade designations NCP100 and NCP-200, and have a number average molecular weight of about 6300 and 1300 respectively.

Another class of polysilazane precursors are polyorgano (hydro) silazanes having units of the structure

where R₁ is the same or different hydrocarbyl, alkylsilyl, alkylamino or alkoxy and 0.4<X<1. These materials are disclosed in U.S. Pat. No. 4,659,850, the complete disclosure of which is incorporated herein by reference.

Another preferred ceramic precursor is a polysilastyrene having the structure [-(phenyl)(methyl)Si-Si(methyl)₂-]ₙ available under the trade designation "Polysilastyrene-120" from Nippon Soda, Japan. This material has a number average molecular weight of about 2000 and the primary pyrolysis products (>1300° C.) of this precursor in an inert atmosphere are silicon carbide and carbon.

Other preferred ceramic precursors are polycarbosilanes having units of the structure [—Si(CH₃)₂—CH₂—]ₙ and/or [—Si(H)(CH₃)—CH₂—]ₙ having a number average molecular weight in the range of about 1000 to 7000. Suitable polycarbosilanes are available from Dow Corning under the trade designation PC-X9-6348 (Mn=1420 g/mol) and from Nippon Carbon of Japan under the trade designation PC-X9-6348 (Mn=1420 g/mol). The main pyrolysis product of these materials (>1300° C.) in an inert atmosphere are silicon carbide and excess carbon.

Vinylic polysilanes useful in this invention are available from Union Carbide Corporation under the trade designation Y-12044. These yield silicon carbide together with excess carbon as the main pyrolysis products in an inert atmosphere at elevated temperatures.

Suitable polyalazane (alumane) preceramic precursors are those having recurring units of the structure R—Al—N—R', where R and R', are the same or different hydrocarbyl groups (particularly $C_1$-$C_4$ alkyl), and are described in an article "Polymer Precursors For Aluminum Nitride Ceramics", J. A. Jensen, pp. 845–850, in "Better Ceramics Through Chemistry", MRS Symposium Proceedings, Vol. 271. The main pyrolysis product of these materials at temperatures in excess of 400° C. is aluminum nitride.

Other suitable preceramic precursors will be evident to those skilled in the art, particularly those yielding SiC, $Si_3N_4$, Si—C—N, BN, Si—B—N, $B_4$C—BN—C, Si—B—C, Si—Al—N, B—Al—N and AlN as pyrolysis products at elevated temperatures.

The ceramic composition and the degree of microporosity which can be achieved in accordance with the present invention will vary as a function of the identity of the ceramic precursor, its decomposition chemistry and reaction chemistry with ammonia, the rate of pyrolysis temperature increase and the maximum pyrolysis temperature. Different degrees of microporosity can be achieved with different precursors when pyrolyzed under essentially identical conditions. Operating within the pyrolysis parameters disclosed will yield microporous ceramics having a surface area in excess of 100 $m^2$/g, e.g., in excess of 200 $m^2$/g, up to about 500 $m^2$/g and a micropore volume in excess of 0.05 $cm^3$/g, e.g., in excess of 0.09 $cm^3$/g up to about 0.20 $cm^3$/g.

Prior to pyrolysis, the precursor may be formed into any desired shape such as a pellet, disc, fiber, thin membrane or other three dimensional shape. The dry precursor may be shaped using an extruder or a hydraulic press, with or without heat being applied, or by conducting the pyrolysis in a suitable mold cavity containing the precursor. Fibers may be prepared by extruding or spinning a melt or a solvent solution of the precursor, while thin separation membranes may be formed by applying a melt or solvent solution of the precursor to the surface of a suitable substrate, such as another ceramic, and subjecting the structure to well known spin or whirl coating techniques to form a uniform, thin coating of the precursor on the surface of the substrate, followed by heating to evaporate off the solvent where solvent is present. Suitable solvents include aromatic or aliphatic hydrocarbons as well as ethers. Preferably, the precursor material is not subjected to any chemical pre-treatment, such as crosslinking via irradiation, prior to the pyrolysis treatment.

As indicated above, pyrolysis of the precursor is next conducted by heating it under flowing ammonia gas, at a controlled rate of temperature increase, and preferably with hold times at intermediate temperatures to maintain uniformity of the ceramic product and a final hold time at the maximum heating temperature ($T_{max}$), followed by gradual cooling of the ceramic end product to room temperature.

Several criteria have been identified as very important for the development of a microporous structure within the ceramic. First, the rate of temperature increase must be controlled to less than about 5° C. per minute at temperatures approaching that at which the developing ceramic begins to crosslink, and also during progressive heating through temperatures at which the bulk of the molecular decomposition products evolve. This controlled heating allows the molecular decomposition products to slowly diffuse through the ceramic and minimizes the development of a mesoporous structure. For most precursor materials, this range where the temperature increase must be strictly controlled will be from about 300° C. to 600° C., more preferably from about 200° C. to 700° C. Thus, regardless of the rate of heating outside of this temperature range, the rate of temperature increase is less than 5° C. per minute between temperatures of about 300° C. to 600° C. or between 300° C. and $T_{max}$ if $T_{max}$ is less than 600° C., more preferably between 200° C. and 700° C. In a more preferred embodiment, the rate of temperature increase within these temperature ranges is less than 3° C. per minute, more preferably from about 0.5° to 2° C. per minute. Outside of these ranges, the rate of temperature increase may be as high as 10° C. per minute, although it is preferred to conduct the entire heating process up to $T_{max}$ (or 1200° C.) at a rate of less than 5° C. per minute.

A second and preferred factor which influences the development of microporous structure is hold time between the time the developing ceramic reaches a specific holding temperature and the time that the temperature is once again increased. It has been found that the developing ceramic preferably should be held at least about 1 hour at least at two plateaus within the range of 200° C.±25° C. to 600° C.±25° C., or 200° C.±25° C. to $T_{max}$ if $T_{max}$ is less than 600° C. More preferably, the developing ceramic is held for about 1-6 hours at temperatures of 200° C., 300° C., 400° C., 500° C., 700° C., 850° C., and 1000° C., each plus or minus 25° C. where $T_{max}$ is above 400° C., and retained at $T_{max}$ for a period of 0.5 to 2 hours prior to gradual cooling of the ceramic back to room temperature. Retention of the ceramic at those holding temperatures allows the decomposition products which have generated to slowly diffuse out of the ceramic prior to further heating progression or prior to the final cooling step.

A third factor which influences the surface area and degree of microporosity is the maximum temperature ($T_{max}$) to which the ceramic is heated. Generally speaking, microporosity disappears or is diminished when $T_{max}$ is 1200° C. For most preceramic polymers pyrolyzed under ammonia gas, the degree of microporosity tends to be at maximum levels for $T_{max}$ between about 400° C. and 1000° C., more particularly between about 500° C. and 750° C.

Ceramic precursor polymers pyrolyzed in accordance with this invention generally exhibit a post-pyrolysis ceramic yield of at least about 50% by weight of the weight of the starting precursor, more preferably at least 55% by weight.

Holding times and temperatures are dictated by ceramic precursor decomposition kinetics and reaction kinetics with ammonia, and depend on precursor composition and the evolution of specific molecular species at or about the holding temperature, e.g., hydrogen, methane, higher molecular weight hydrocarbon species, low molecular weight precursor fragments, and H—C—N species, as reflected by sample weight losses at or about these temperatures. The flow rate of the ammonia gas may range from about 100 to about 1000 cc/min.

In one embodiment of the invention, pyrolysis is carried out in a heat treating furnace or muffle oven using the following schedule and using flowing ammonia gas throughout:

i) after flushing the furnace with ammonia gas, the temperature is first increased from about 25° C. to about 200°±25° C. over a period of 45 to 120 minutes, held at that temperature, i.e., 200°±25° C., for a period of 1–6 hours, preferably 2–5 hours and the temperature then increased;

ii) in the second step, the temperature may be increased from about 200° C. to about 300°±25° C. over a time of from about 35 to 240 minutes, more preferably about 45 to 200 minutes, and held at that temperature, i.e., 300°±25° C. for 1–6 hours, preferably 2–5 hours, and the temperature again increased;

iii) in the third step, the temperature may be increased from about 300° C. to 400°±25° C. over a time period of from about 35 to 240 minutes, more preferably from about 45 to 200 minutes and held at that temperature, i.e., 400°±25° C., for 1–6 hours, more preferably from 2–5 hours, and the temperature again increased;

iv) in the fourth step the temperature is increased to $T_{max}$ or about 500°±25° C., whichever is less, over a time period of from about 35 to 240 minutes, more preferably from about 45 to 200 minutes and held at that temperature, i.e., 500°±25° C., for 1–6 hours, more preferably from 2–5 hours;

v) in a fifth step where $T_{max}$ is above 500° C., the temperature is increased to $T_{max}$ or about 700°±25° C., whichever is less, over a time period of from about 35 to about 240 minutes, more preferably from about 45 to 200 minutes, and held at that temperature, 700°±25° C., for 1–6 hours, preferably 2–5 hours:

vi) in a subsequent step where $T_{max}$ ranges between 700° C. and 1200° C., e.g. 850°±25° C. the temperature is increased to $T_{max}$ over a time period of up to 5 hours, preferably 1–3 hours, and held at $T_{max}$ for 1–6 hours, preferably 2–5 hours.

In the most preferred embodiment of the invention, the pre-precursor is heated as above with a 4–5 hour hold at about 200° C., 300° C., 400° C., 500° C. and 700° C. (and $T_{max}$ if $T_{max}$ is greater than 700° C.), and the pyrolyzed ceramic then allowed to return from $T_{max}$ to room temperature while continuing the flow of ammonia during the cooling period. The time of cooling may range from about 1–8 hours.

The following examples are illustrative of the invention. As used in the examples and tables, the following designations have the following meanings:

NCP-100—A polysilazane polymer available from the Chisso Corporation of Japan having a number average molecular weight of about 6300 g/mole and a melting point of about 200° C.

NCP-200—A polysilazane polymer available from the Chisso Corporation of Japan having a number average molecular weight of about 1300 g/mole and a melting point of about 100° C.

PCS—A polycarbosilane preceramic polymer available from Nippon Carbon Company of Japan (U.S. distribution Dow Chemical Company) having a number average molecular weight of about 2000 g/mole and a melting point of about 100° C.

PSS—A polysilastyrene preceramic polymer available from Nippon Soda Corporation of Japan under the designation "Polysilastyrene-120", having a number average molecular weight of about 2000 g/mole and a melting pointing of about 200° C.

EXAMPLE 1

Starting samples of 3.0 grams each of the NCP-200 polysilazane preceramic polymer were prepared by grinding it in an agate mortar and pestle. After grinding, each starting sample was placed in a separate aluminum oxide boat and inserted in the steel liner of a heat treating furnace, and purged with flowing ammonia at a flow rate of 300 cc/min for about 30 minutes. The starting materials were then heated in flowing ammonia gas to a final temperature $T_{max}$ of 500° C., 600° C., 700° C., 850° C. or 1000° C., respectively. The general time-temperature sequence used, after purging with ammonia, was as follows. The furnace was heated under ammonia at a flow rate of 300 cc/min to 200° C. in 60 minutes, held at 200° C. for 240 minutes, heated to 300° C. in 120 minutes, held at 300° C. for 300 minutes, and heated to 400° C. in 120 minutes, held at 400° C. for 300 minutes, and heated to 500° C. in 120 minutes. If this is the final temperature, the sample was held at 500° C. for 120 minutes, followed by gradual cooling to room temperature. For $T_{max}$ of 600° C., the sample was held at 500° C. for 300 minutes and then heated from 500° C. to 600° C. in 60 minutes, and held for 120 minutes before cooling to room temperature. For a 700° C. run schedule, the sample held at 500° C. was heated from 500° C. to 700° C. in 120 minutes, and held for 120 minutes before cooling to room temperature. For an 850° C. run schedule, hold sample at 700° C. for 300 minutes and heat from 700° C. to 850° C. in 120 minutes, and hold for 120 minutes before cooling to room temperature. For a 1000° C. run, hold the sample at 850° C. for 300 minutes and heat from 850° C. to 1000° C. in 120 minutes and hold at that temperature for 120 minutes, before cooling to room temperature in 480 minutes. The resulting ceramic product in each case was weighed and a nitrogen absorption isotherm was determined, and analyzed by the BET method to obtain the surface area, and by the t-plot method to obtain the micropore volume and meso/macro surface area. The product weight, micropore volume, total surface area, and surface area due to mesopores or macro-surface area for each sample are listed in Table 1. The surface area associated with microporosity is approximately equal to the difference in column 5 and column 6. In all cases for $T_{max}$ in the range 500°–850° C., the samples exhibited a Type 1 nitrogen adsorption isotherm and significant micropore volume. The samples heated to 1000° C. exhibited mesoporosity, rather than microporosity. Scanning electron microscopy characterization of particle size for samples D40-1, D42-1 and D43-1 put an upper limit on macro-surface area of about 1–2 m²/gm.

TABLE 1

Data For Example 1*

| Sample Number | PCP | Product Sample Weight (grams) | $T_{max}$ (°C.) | Total Surface Area (m²/gm) | Meso/ Macro Surface Area (m²/gm) | Micropore Volume (cm³/gm) |
|---|---|---|---|---|---|---|
| D41-1 | NCP-200 | 2.02 | 500 | 419 | 49 | 0.1620 |
| D45-1 | NCP-200 | 1.81 | 600 | 359 | 10 | 0.1415 |
| D39-1 | NCP-200 | 1.75 | 700 | 318 | 9 | 0.1316 |
| D47-3 | NCP-200 | 1.75 | 700 | 177 | 57 | 0.0496 |
| D49-1 | NCP-200 | 1.79 | 850 | 328 | 9 | 0.1334 |
| D40-1 | NCP-200 | 1.70 | 1000 | 65 | 76 | 0 |
| D42-1 | NCP-200** | 1.71 | 1000 | 155 | 167 | 0 |
| D43-1 | NCP-200 | 1.81 | 1000 | 109 | 73 | 0.0066 |

*Where the total surface area significantly exceeds the meso/macro surface area, the difference reflects the area associated with micropores.
**The PCP granular starting sample was used without grinding in a mortar and pestle.

EXAMPLE 2

Example 1 was repeated, as detailed in Table 2, except that instead of NCP-200 polysilazane, 3.0 gm samples of a NCP100 polysilzane were used in the pyrolysis experiments. In most cases for $T_{max}$ in the range 500°–850° C., the samples exhibited a Type 1 nitrogen adsorption isotherm and significant micropore volume. The samples heated to 1000° C. exhibited both microporosity and mesoporosity. Particle size and micropore determination of product sample D43-2 indicated that mesoporosity, rather than macro-surface area, is involved.

TABLE 2

Data For Example 2*

| Sample Number | PCP | Product Sample Weight (grams) | $T_{max}$ (°C.) | Total Surface Area ($m^2$/gm) | Meso/Macro Surface Area ($m^2$/gm) | Micropore Volume ($cm^3$/gm) |
|---|---|---|---|---|---|---|
| D41-2 | NCP-100 | 1.69 | 500 | 458 | 88 | 0.1770 |
| D45-2 | NCP-100 | 1.74 | 600 | 48 | 34 | 0.0030 |
| D39-4 | NCP-100 | 2.25 | 700 | 248 | 42 | 0.0950 |
| D64-7 | NCP-100 | 2.20 | 700 | 313 | 8.5 | 0.1170 |
| D49-2 | NCP-100 | 2.22 | 850 | 303 | 15 | 0.1238 |
| D40-2 | NCP-100 | 2.12 | 1000 | 228 | 19 | 0.0915 |
| D42-2 | NCP-100** | 2.27 | 1000 | 204 | 55 | 0.9590 |
| D43-2 | NCP-100 | 2.27 | 1000 | 43 | 38 | 0.0070 |

*Where the total surface area significantly exceeds the meso/macro surface area, the difference reflects the area associated with micropores.
**The PCP granular starting sample was used without grinding in a mortar pestle.

EXAMPLE 3

Example 1 was repeated, as detailed in Table 3, except that instead of NCP-200 polysilazane, 3.0 gm samples of a PCS polycarbosilane were used in the pyrolysis experiments. For a $T_{max}$ of 500° C., the ceramic products in Table 3 were primarily mesoporous. For the case of $T_{max}$ in the range 600°–850° C., the samples exhibited a Type 1 nitrogen adsorption isotherm and significant micropore volume.

TABLE 3

Data For Example 3*

| Sample Number | PCP | Product Sample Weight (grams) | $T_{max}$ (°C.) | Total Surface Area ($m^2$/gm) | Meso/Macro Surface Area ($m^2$/gm) | Micropore Volume ($cm^3$/gm) |
|---|---|---|---|---|---|---|
| D41-1 | PCS | 1.75 | 500 | 260 | 221 | 0.0036 |
| D48-1 | PCS | 1.93 | 500 | 96 | 110 | 0 |
| D45-4 | PCS | 1.86 | 600 | 464 | 18 | 0.1779 |
| D38-3 | PCS | 1.95 | 700 | 370 | 5 | 0.1446 |
| D39-10 | PCS | 1.76 | 700 | 430 | 11 | 0.1652 |
| D47-5 | PCS | 1.44 | 700 | 195 | 56 | 0.0625 |
| D49-4 | PCS | 1.81 | 850 | 327 | 9 | 0.1256 |
| D40-4 | PCS | 1.83 | 1000 | 319 | 12 | 0.1265 |

*Where the total surface area significantly exceeds the meso/macro surface area, the difference reflects the area associated with micropores.

EXAMPLE 4

Example 1 was repeated, as detailed in Table 4, except that instead of NCP-200 polysilazane, 3.0 gm samples of a PSS120 polysilastyrene were used in the pyrolysis experiments. For a $T_{max}$ over the entire range 500°–1000° C., the ceramic products in Table 4 exhibited a Type 1 nitrogen adsorption isotherm and significant micropore volume. A lesser amount of mesoporosity was typically observed at and above 700° C.

TABLE 4

Data For Example 4*

| Sample Number | PCP | Product Sample Weight (grams) | $T_{max}$ (°C.) | Total Surface Area ($m^2$/gm) | Meso/Macro Surface Area ($m^2$/gm) | Micropore Volume ($cm^3$/gm) |
|---|---|---|---|---|---|---|
| D41-3 | PSS-120 | 2.49 | 500 | 385 | 34 | 0.1517 |
| D48-2 | PSS-120 | 1.68 | 500 | 532 | 86 | 0.2020 |
| D45-3 | PSS-120 | 1.50 | 600 | 467 | 19 | 0.1798 |
| D39-7 | PSS-120 | 1.44 | 700 | 418 | 10 | 0.1609 |
| D47-4 | PSS-120 | 1.39 | 700 | 285 | 36 | 0.1132 |
| D49-3 | PSS-120 | 1.40 | 850 | 437 | 11 | 0.1652 |
| D40-3 | PSS-120 | 1.34 | 1000 | 354 | 12 | 0.1386 |

*Where the total surface area significantly exceeds the meso/macro surface area, the difference reflects the area associated with micropores.

EXAMPLE 5

This example illustrates the importance of conducting the pyrolysis of various preceramic precursor materials at a controlled rate of heating in order to achieve maximum development of a micropore structure within the ceramic.

A series of precursor samples identified in Table 5 were pyrolyzed under standard conditions, using ammonia gas as described in Example 1, to $T_{max}$ of 700° C. Another series of samples were pyrolyzed using ammonia gas as described in Example 1, except that the rate of temperature increase throughout the heating range of 25° C. to 700° C. was maintained at 0.83°, 1.66°, 2.50°, 3.32° or 6.64° C. per minute respectively. Hold times and holding temperatures were as indicated in Example 1. Pyrolysis results at 700° C. in terms of porosity achieved in the ceramic are shown in Tables 5A, 5B, 5C and 5D.

$NH_3$ Pyrolysis/$T_{max}$=700° C.

TABLE 5A

NCP-200 Polysilazane

| Heating Rate (°C./Minute) | Total Surface Area ($m^2$/gm) | Meso Surface Area ($m^2$/gm) | Micropore Volume ($cm^3$/gm) |
|---|---|---|---|
| Standard # | 318 | 9 | 0.1316 |
| 0.83 | 225 | 17 | 0.0887 |
| 1.66 | 341 | 10 | 0.1293 |
| 2.50 | 189 | 50 | 0.0609 |
| 3.32 | 187 | 21 | 0.0726 |
| 6.64 | 74 | 35 | 0.02 |

TABLE 5B

NCP-100 Polysilazane

| Heating Rate (°C./Minute) | Total Surface Area ($m^2$/gm) | Meso Surface Area ($m^2$/gm) | Micropore Volume ($cm^3$/gm) |
|---|---|---|---|
| Standard # | 313 | 8.5 | 0.1170 |
| 0.83 | 272 | 29 | 0.1082 |
| 1.66 | 269 | 21 | 0.1059 |
| 2.50 | 219 | 46 | 0.0732 |
| 3.32 | 310 | 17 | 0.1265 |
| 6.64 | 47 | 37 | 0.0049 |

TABLE 5C

PCS Polycarbosilane

| Heating Rate (°C./Minute) | Total Surface Area (m²/gm) | Meso Surface Area (m²/gm) | Micropore Volume (cm³/gm) |
|---|---|---|---|
| Standard # | 430 | 11 | 0.1652 |
| 0.83 | 412 | 9 | 0.1565 |
| 1.66 | 469 | 15 | 0.1781 |
| 2.50 | 77 | 21 | 0.0236 |
| 3.32 | 40 | 15 | 0.0108 |
| 6.64 | 28 | 24 | 0.0012 |

TABLE 5D

PCS Polysilastyrene

| Heating Rate (°C./Minute) | Total Surface Area (m²/gm) | Meso Surface Area (m²/gm) | Micropore Volume (cm³/gm) |
|---|---|---|---|
| Standard # | 418 | 10 | 0.1609 |
| 0.83 | 376 | 16 | 0.1477 |
| 1.66 | 360 | 9 | 0.1369 |
| 2.50 | 352 | 25 | 0.1340 |
| 3.32 | 270 | 15 | 0.1028 |
| 6.64 | 16 | NA | None |

Standard # = 1 hr RT to 200° C. @ 2.8° C./min, 4 hr at 200° C.;
2 hr to 300° C. @ 0.83° C./min, 5 hr at 300° C.;
2 hr to 400° C. @ 0.83° C./min, 5 hr at 400° C.;
2 hr to 500° C. @ 0.83° C./min, 5 hr at 500° C.;
2 hr to 700° C. @ 1.67° C./min, 2 hr at 700° C.,
8 hr to room temperature The results shown in Tables 5A through 5D demonstrate a marked deterioration in total surface area and Micropore Volume (MV) for all samples at pyrolysis heating rates of 6.64° C. per minute. For PSS polysilastyrene, this deterioration is evidenced at a temperature heating rate of 3.32° C. per minute; for NCP-200 polysilazane and PCS polycarbosilane, the deterioration occurs at a heating rate of 2.50° C. per minute. Thus, the development of maximum micropore volume is a function of both the structure of the starting ceramic precursor and the rate of temperature increase during pyrolysis.

EXAMPLE 6

Control

A sample of 3 gm of NCP-200 polysilazane was ground in a mortar and pestle and heated in an alumina crucible using the heating schedule described in Example 1, except that flowing helium gas was used instead of flowing ammonia gas. After heating to 700° C., the resulting product sample exhibited a very low surface area (<1 m²/gm), with no microporosity observed in the nitrogen adsorption and no micropore volume.

EXAMPLE 7

Control

A sample of 3 gm of NCP-100 polysilazane was ground in a mortar and pestle and heated in an aluminum crucible using the heating schedule described in Example 1, except that flowing helium gas was used instead of flowing ammonia gas. After heating to 700° C., the resulting product sample exhibited a very low surface area (<1 m²/gm), with no microporosity observed in the nitrogen adsorption.

EXAMPLE 8

Control

Example 7 was repeated except that PSS polysilastyrene was substituted for NCP-100 polysilazane. After heating to 700° C., the resulting product exhibited a surface area of less than 1 m²/gm with no observable microporosity.

EXAMPLE 9

Control

Example 7 was repeated except that PCS polycarbosilane was substituted for NCP-100 polysilazane. After heating to 700° C., the resulting product exhibited a surface area of less than 1 m²/gm with no observable microporosity.

Control Examples 6–9 demonstrate that heating the various ceramic precursors in inert gas, such as helium, does not provide ceramic products having the microporous structure which is the subject matter of this invention.

What is claimed is:

1. A process for preparing a microporous ceramic product having a surface area in excess of 100 m²/gm and a volume of open-pore micropores of greater than about 0.05 cm³/gm, comprising:

a. gradually heating a ceramic precursor oligomer or polymer having a number average molecular weight in the range of from about 200 to about 100,000 g/mole in the presence of ammonia gas to a maximum temperature ($T_{max}$) in the range of about 400° C. up to less than 1200° C., said heating characterized by a rate of temperature increase between about 300° C. to 600° C., except that when $T_{max}$ is less than 600° C. the temperature increase is from about 300° C. to $T_{max}$, of less than about 5° C. per minute; and b. gradually cooling said microporous ceramic product from $T_{max}$ to room temperature.

2. The process of claim 1 wherein the micropores have a mean diameter of less than about 20 Angstroms.

3. The process of claim 1 wherein $T_{max}$ is less than about 1000° C.

4. The process of claim 1 wherein said ceramic precursor is selected from the group consisting of polysilazanes, polycarbosilazanes, perhydropolysilizanes, polycarbosilanes, vinylic polysilanes, amine boranes, polyphenylborazanes, carboranesiloxanes, polysilastyrenes, polytitanocarbosilanes, alumanes, polyalazanes and mixtures thereof.

5. The process of claim 4 wherein said ceramic precursor is a polysilazane.

6. The process of claim 1 wherein said microporous ceramic product has a surface area in excess of 200 m²/gm and a micropore volume of greater than 0.09 cm³/gm.

7. The process of claim 1 wherein said microporous ceramic product has a surface area in excess of about 250 m²/gm.

8. The process of claim 3 wherein said microporous ceramic product has a surface area in excess of about 300 m²/gm and a micropore volume of greater than 0.13 cm³/gm.

9. The process of claim 1 wherein said rate of temperature increase of less than 5° C. per minute is maintained at temperatures between about 200° C. to 700° C.

10. The process of claim 1 wherein said precursor is heated to a maximum temperature in the range of from about 500° C. to less than about 1000° C.

11. The process of claim 8 wherein said precursor is heated to a maximum temperature in the range of from about 500° C. to about 750° C.

12. The process of claim 1 wherein said heating step is further characterized by at least two holding periods within the range of between 200° C.±25° C. and 600° C.±25° C. or between 200° C.±25° C. and $T_{max}$ if $T_{max}$ is less than 600° C.

13. The process of claim 12 wherein said heating step includes a holding period of from about 1 to 6 hours at approximately 300°±25° C.

14. The process of claim 13 wherein said heating step includes a holding period of from about 1 to 6 hours at approximately 400°±25° C.

15. The process of claim 14 wherein said heating step includes a holding period of from about 1 to 6 hours at approximately 500°±25° C.

16. The process of claim 15 wherein said heating step includes a holding period of from about 1 to 6 hours at approximately 700°±25° C.

17. The process of claim 16 wherein said heating step includes a holding period of about 1 to 6 hours at approximately 850°±25° C.

18. The process of claim 13 wherein said heating step includes a holding period of from about 1 to 6 hours at 200°±25° C.

19. The process of claim 1 wherein said rate of temperature increase is less than about 3° C. per minute.

20. The process of claim 19 wherein said rate of temperature increase ranges from about 0.5° to 2° C. per minute.

21. The process of claim 1 wherein the yield of said microporous ceramic product is at least about 50% by weight of the weight of said ceramic precursor.

22. The product of claim 1.

23. The microporous ceramic product of claim 22 having a surface area in excess of about 150 m$^2$/gm.

24. The microporous ceramic product of claim 23 having a surface area in excess of about 200 m$^2$/gm and a micropore volume of greater than about 0.09 cm$^3$/gm.

* * * * *